(12) United States Patent
Bergenwall et al.

(10) Patent No.: US 7,924,838 B1
(45) Date of Patent: Apr. 12, 2011

(54) ADVANCED SERVICE ARCHITECTURE FOR NEXT GENERATION NETWORK SERVICES AND INTELLIGENT DATA NETWORK ROUTER

(75) Inventors: Martin Bergenwall, Espoo (FI); Kengatharan Sivalingam, Helsinki (FI); Sami Uskela, Helsinki (FI); Hakan Mitts, Helsinki (FI); Petteri Pöyhönen, Helsinki (FI); Aapo Rautiainen, Espoo (FI); Mari K. Nieminen, Tampere (FI); Eva-Maria Leppänen, Tampere (FI); Lucia Tudose, Espoo (FI); Andrei Krüger, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/070,212

(22) PCT Filed: Apr. 17, 2000

(86) PCT No.: PCT/EP00/03478
§ 371 (c)(1),
(2), (4) Date: Jun. 12, 2002

(87) PCT Pub. No.: WO01/20856
PCT Pub. Date: Mar. 22, 2001

(30) Foreign Application Priority Data

Sep. 13, 1999 (WO) .............. PCT/EP99/06759

(51) Int. Cl.
*H04L 12/56* (2006.01)
(52) U.S. Cl. .............. 370/392; 370/400; 370/401
(58) Field of Classification Search ............ 370/392, 370/400, 401
See application file for complete search history.

(56) References Cited

U.S. PATENT DOCUMENTS 5,745,488 A 4/1998 Thompson et al. ......... 370/395
5,751,799 A * 5/1998 Mori ................ 379/114.09
(Continued)

FOREIGN PATENT DOCUMENTS

EP 0 702 477 A2 * 3/1996
(Continued)

OTHER PUBLICATIONS

Johnson D.: "Provisioning Services" Telephony, US, Chicago, IL., vol. 226, No. 22, May 30, 1994, pp. 24-25, ISSN: 0040-2656.

*Primary Examiner* — Jason E Mattis
(74) *Attorney, Agent, or Firm* — Mintz, Levin, Cohn, Ferris, Glovsky, and Popeo, P.C.

(57) ABSTRACT

According to the present invention, a plurality of data packets are received and routed by a router (1) in a data network. The router (1) comprises storing means (11) for storing a predefined list of rules for detecting special data packets, detecting means (12) for detecting special data packets in the received plurality of data packets on the basis of the predefined list of rules stored in said storing means (11), and routing means (13) for requesting instructions for the special data packets detected by said detecting means (12) and for routing the special data packets in accordance with instructions received on request. According to the present invention, an advanced service architecture for next generation network services is provided. In this service architecture, the functions of the detecting means (12) and the routing means (13) can be achieved by a service trigger and a service logic, respectively.

20 Claims, 4 Drawing Sheets

U.S. PATENT DOCUMENTS

| | | | |
|---|---|---|---|
| 5,781,431 A | 7/1998 | Duret et al. | 364/148 |
| 6,335,935 B2 * | 1/2002 | Kadambi et al. | 370/396 |
| 6,392,997 B1 * | 5/2002 | Chen | 370/252 |
| 6,496,505 B2 * | 12/2002 | La Porta et al. | 370/392 |
| 6,507,908 B1 * | 1/2003 | Caronni | 713/153 |
| 6,523,068 B1 * | 2/2003 | Beser et al. | 709/238 |
| 6,549,516 B1 * | 4/2003 | Albert et al. | 370/236 |
| 6,577,865 B2 * | 6/2003 | Dikmen et al. | 455/433 |
| 6,600,744 B1 * | 7/2003 | Carr et al. | 370/392 |
| 6,636,501 B1 * | 10/2003 | Dispensa et al. | 370/351 |
| 6,925,076 B1 * | 8/2005 | Dalgic et al. | 370/356 |
| 7,051,066 B1 * | 5/2006 | Albert et al. | 709/202 |

FOREIGN PATENT DOCUMENTS

| | | |
|---|---|---|
| EP | 0 936 825 A2 | 8/1999 |
| WO | WO 98/36542 | 8/1998 |
| WO | WO 99/00737 | 1/1999 |
| WO | WO 99/00946 | 1/1999 |

* cited by examiner

ADVANCED SERVICE ARCHITECTURE FOR NEXT GENERATION NETWORK SERVICES AND INTELLIGENT DATA NETWORK ROUTER

PRIORITY CLAIM

This is a national stage of PCT application No. PCT/EP00/03478, filed on Apr. 17, 2000, and of PCT Application No. PCT/EP99/06759, filed on Sep. 13, 1999. Priority is claimed on both of these applications.

FIELD OF THE INVENTION

The present invention relates to packet data transmission between mobile networks supporting Internet Protocol (IP) like the General Packet Radio Service (GPRS) network and data networks like the Internet, and in particular to a method and an apparatus for receiving and routing data packets in a data network. Moreover, the present invention relates to a method and an apparatus for receiving data packets and providing services for the received data packets in a data network.

BACKGROUND OF THE INVENTION

Data or packet-switched networks like the Internet comprise routers for routing data packets in the data network. In a conventional router, routing of data packets is affected by a classifier for detecting incoming data packets. The conventional Internet routers comprise semi-static routing tables for routing the data packets, the routing tables being updated only via separate management procedures or via dialog between routers using special routing protocols.

However, with conventional routers several problems arise. In case of new routers propagating with conventional routing protocols, propagation of data packets in the network is slow and a dynamic update of routers is not easy, since all routers must know the handling of all packets and if the handling for one user changes all routing tables in all routers must be updated. Consequently, the routing tables of conventional routers are getting large. If every user wants his own packet handling the routing tables grow too much for the routers.

Moreover, similar problems arise with a conventional service model in a packet data environment. The conventional service model consists of a service trigger and a service logic which may be located in a router. Such model does not provide the flexibility required by the advanced services in the packet data domain.

SUMMARY OF THE INVENTION

It is an object of the present invention to improve routing possibilities by providing dynamically and per user configurable routing in a data network as well as a dynamic and flexible service architecture.

According to a first aspect of the present invention, there is provided an apparatus for receiving a plurality of data packets and for routing the data packets in a data network. This apparatus comprises storing means for storing a pre-defined list of rules for detecting special data packets, detecting means for detecting special data packets in the received plurality of data packets on the basis of the pre-defined list of rules stored in the storing means, and routing means for requesting instructions for the special data packets detected by the detecting means and for routing the special data packets in accordance with instructions received on request.

Furthermore, according to the first aspect of the present invention, there is provided a method for receiving a plurality of data packets and for routing the data packets in a data network. According to this method, a pre-defined list of rules for detecting special data packets is stored, special data packets in the received plurality of data packets are detected on the basis of the stored pre-defined list of rules, and instructions for the detected special data packets are requested and the special data packets are routed in accordance with instructions received on request.

Furthermore, there is provided a data network system in which the apparatus according to the first aspect of the present invention is employed.

The apparatus according to the first aspect of the present invention further comprises an internal entity. Detected special data packets are notified to the internal entity by the routing means which requests instructions for the special data packets therefrom.

Alternatively, the routing means notifies an external entity of the detected special data packets and requests instructions for the special data packets therefrom.

According to the present invention, routing in accordance with instructions received on request also includes the "normal routing" possibility where a command from the external or internal entity states that no special routing is necessary, for example when only statistics and information is to be collected but no special routing is required.

According to the present invention, the original rules that indicate which packets are special packets and need special handling are stored in the storing means by the external entity.

Moreover, the rules stored in the storing means as well as the instructions stored in the internal entity can be dynamically determined and updated in real-time in response to events, which are detected by the detecting means and reported by the routing means to the external entity. Thus, the content of the storing means and the internal entity can be changed "on the fly", i.e. during active operations. The internal entity may also update, add or remove some rules.

For example, the external entity may store some rules to detect special packets. When such a packet arrives in the router the external or internal entity may modify the rules, e.g. remove the specific rule if only the first matching packet was of interest.

In routing the special data packets, the routing means is able to modify the special data packets in accordance with the received instructions. For example, the routing means can modify the content of the data packets, e.g. the packet headers, it can duplicate data packets or control dropping of data packets.

Moreover, according to the present invention, the routing means is able to communicate with an external charging entity for charging the routing of the special data packets. For example, the routing means can collect charging information from the charging entity and send charging information to the charging entity. In this way, the special handling of data packets can be charged.

For example, the detection of special packets can be based on any data within the special packet including but not limited to the source or destination IP address, TCP/UDP (Transmission Control Protocol/User Datagram Protocol) port numbers or other IP/UDP/TCP header fields. In other words, the pre-defined list of rules for detecting special packets can include such packet identification marks.

According to a second aspect of the present invention, there is provided an apparatus for receiving a plurality of data packets and for providing services for the data packets in a data network. This apparatus comprises service deciding means for deciding services to be executed for the received plurality of data packets, and service executing means launched by the service deciding means for a decided service. The service executing means executes the decided service for the received data packets. Control means are activated when the service executing means are launched, and control the service deciding means and the service executing means.

In addition, according to the second aspect, there is provided a method of receiving a plurality of data packets and providing services for the data packets in a data network. In this method, services to be executed for the received plurality of data packets are decided and a service decided for the received data packets is launched. Control means are activated for the decided service, and the decided service is executed, wherein the control means control the deciding of services and the execution of decided services.

Finally, according to the present invention, there is provided a data network system in which an apparatus according to the second aspect is employed.

The apparatus according to the second aspect further comprises a database for storing service deciding information which can be read by the service deciding means from the database.

Furthermore, the apparatus comprises service data storing means for storing service specific data that is used by the service executing means. The service specific data comprises the data to run a specific service. For example, the service specific data for the premium rate service is the destination address and tariff.

The service specific data is not part of the service executing means. For example, in case an advertisement adding service is launched, the service deciding means know when to insert the advertisements, the service executing means know how to insert the advertisements and the service specific data contains the actual advertisements. The service specific data may be static or dynamic. For example, it may be dynamic for an advertisement service using location dependent advertisements.

The control means is arranged to access user specific data and to supply the user specific data to the service executing means. The user specific data comprises user preferences regarding a specific service. For example, the user specific data can contain user preferences regarding advertisement selection or packet filtering options in a firewall service.

When a service is launched, the corresponding control means is also activated. Now, the service executing means is able to contact the control means during its execution. For example, in case the service executing means needs user interaction, the control means is able to ask the user and pass the answer to the service executing means.

In addition, the control means is arranged to create new deciding information for the service deciding means. The control means can create new deciding information for a current service, it can delete deciding information or it can activate a totally new service. Thus, new deciding information for the service deciding means, i.e. triggers, can be created on the fly and added to an active service by the control means.

In a packet data environment, the service executing means may be located in the router, while the control means may be located in the Service Control Point (SCP). The router may route the data packets received by the service deciding means in accordance with the services executed on the data packets by the service executing means.

According to an embodiment of the second aspect of the present invention, the service deciding means are called service trigger(s), the service executing means are called service logic and the control means are called event handler. According to Intelligent Network (IN) functional entities, the functions of the service trigger may be implemented in a Service Switching Function (SSF), the service logic may be represented by a Service Logic Program (SLP) and the functionality of the event handler may be performed in a Service Management Point (SMP) and a Specialized Resource Function (SRF), in order to perform message based user interaction according to the Wireless Application Protocol (WAP) or Unstructured Supplementary Service Data (USSD). The service specific data and user specific data may be stored in an SCP database or Service Data Function (SDF) database.

With the special packet handling according to the present invention, it is enough for the router to know that some kind of special handling is needed for special packets. In practice, this means that part of the routing tables can be located in an external entity from which the router requests instructions when needed.

Moreover, with the handling of special packets it is easy to manage scenarios that involve more than one router. For example, a tunnel can dynamically be created from one router to another through special packet handling rules and with the help of an external entity connected to both routers involved in the tunnel. Different external entities may also be connected to each other. On the other hand, one router may be connected to different external entities.

According to the present invention, more intelligence is given to a data network router, enabling implementation of more versatile and dynamic services for users.

In this context, reliable and fast delivery of high priority data packets can be guaranteed. That is, according to the present invention, the delay problem in using IP for real-time applications can be reduced or even eliminated.

Moreover, according to the present invention, a service architecture is presented, which uses techniques such as event handler interaction, trigger updating and service or user specific data updating, to control and execute services in a more dynamic way.

Thus, according to the presented service architecture, the implementation of data services with advanced features for data networks is facilitated.

In the following the present invention will be described by way of preferred embodiments thereof with reference to the accompanying drawings.

DETAILED DESCRIPTION OF THE PREFERRED EMBODIMENTS

Figure 1:
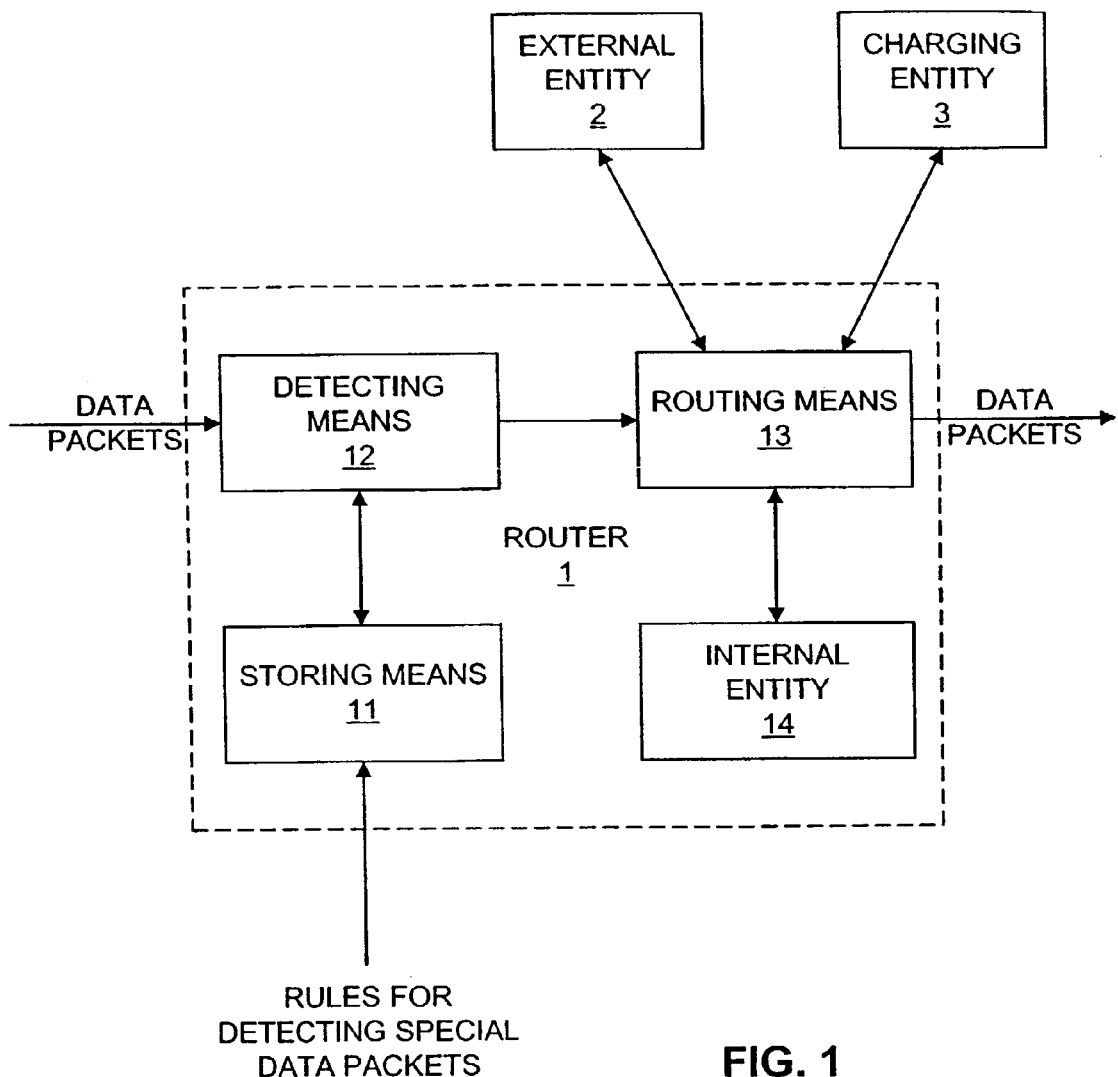
FIG. 1 shows a schematic block diagram of the basic components of a router according to a first embodiment of the present invention.

FIG. 1 shows a schematic block diagram of a router in a data network like the Internet according to a first embodiment of the present invention. The router 1 comprises storing means 11, detecting means 12, routing means 13 and an internal entity 14.

The detecting means 12 receives data packets from a subscriber of a mobile network supporting Internet Protocol like the GPRS network, or data packets which are originated in the data network. In receiving the data packets, the detecting means 12 checks these packets on special packets requiring special handling by the routing means 13, by referring to a pre-defined list of rules for detecting special packets, that is stored in the storing means 11.

When the detecting means 12 detects a special packet, it informs the routing means 13 and forwards the special packet to it. Subsequently, the routing means 13 notifies the detection of a special packet to the internal entity 14 or an external entity 2, requesting instructions for handling the special packet. Having received the requested instructions, the routing means 13 handles the special data packets in accordance with these instructions, for example modifies the packet and outputs or routes it accordingly.

The routing means 13 also communicates with a charging entity 3 for providing charging for some special handling of packets. The charging entity 3 is in a way just another external entity receiving charging related events from the router 1.

The contents of the storing means 11 and the internal entity 14 can be updated dynamically in real-time by the external entity 2 in response to events detected by the detecting means 12 and reported to the external entity 2 by the routing means 13.

A method for receiving and routing data packets according to the first embodiment of the present invention will be described with reference to FIG. 2.

Figure 2:
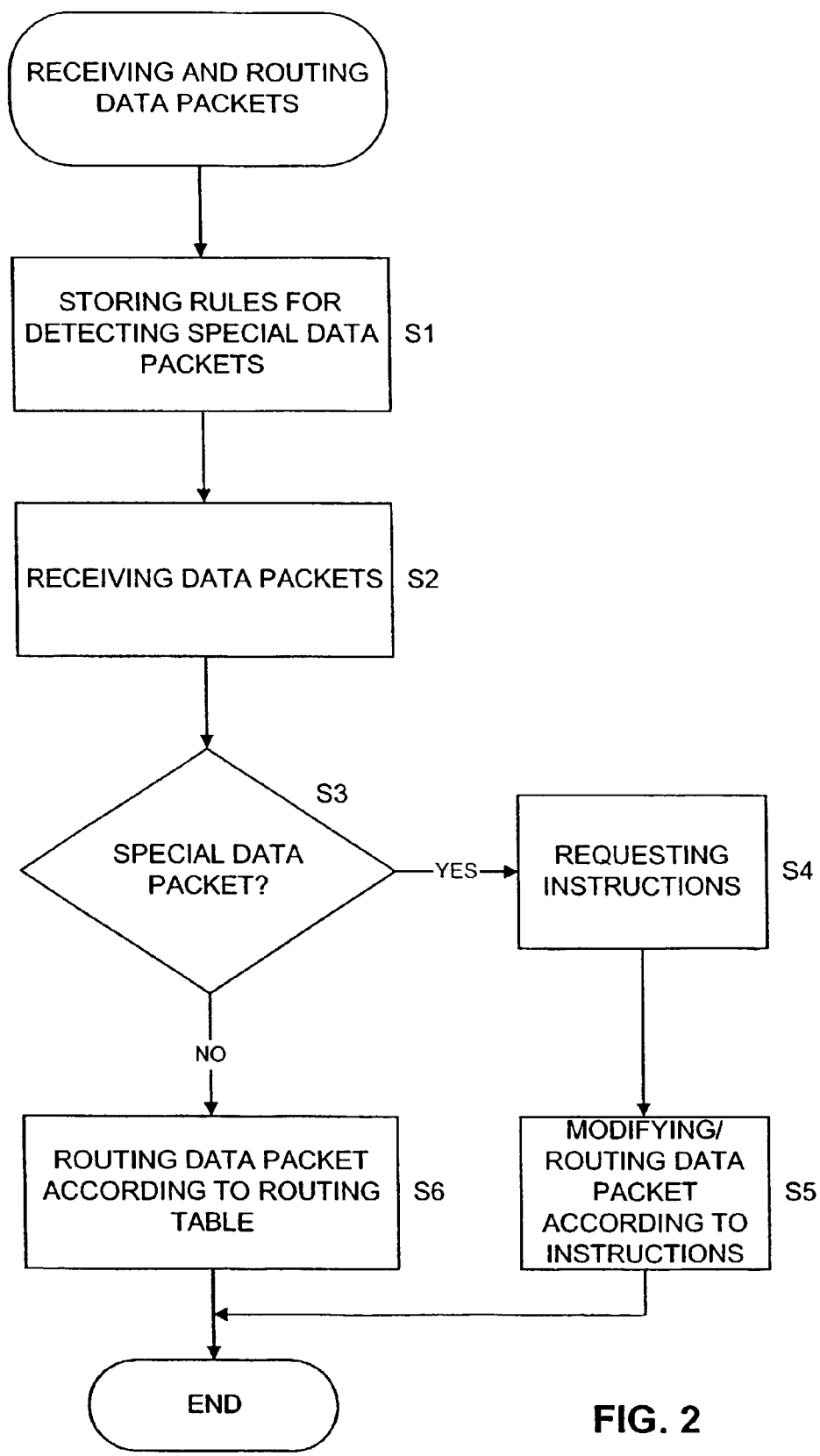
FIG. 2 shows a flowchart of the basic steps of a method according to the first embodiment of the present invention.

In step S1 in FIG. 2, rules for detecting special data packets are stored in a list in the storing means 11. In step S2, data packets are received and it is checked in step S3, whether a received data packet is a special data packet, by referring to the stored rules. If a special data packet is detected in step S3, instructions for handling the special packet are requested in step S4. After having received the requested instructions, the special packet is handled accordingly in step S5.

On the other hand, in case no special data packet is detected in step S3, the "normal" data packet is routed according to a routing table (not shown in FIG. 1) by the routing means 13 (step S6), the routing table being provided in the router 1.

Next, a second embodiment of the present invention will be described with reference to FIGS. 3 and 4.

Figure 3:
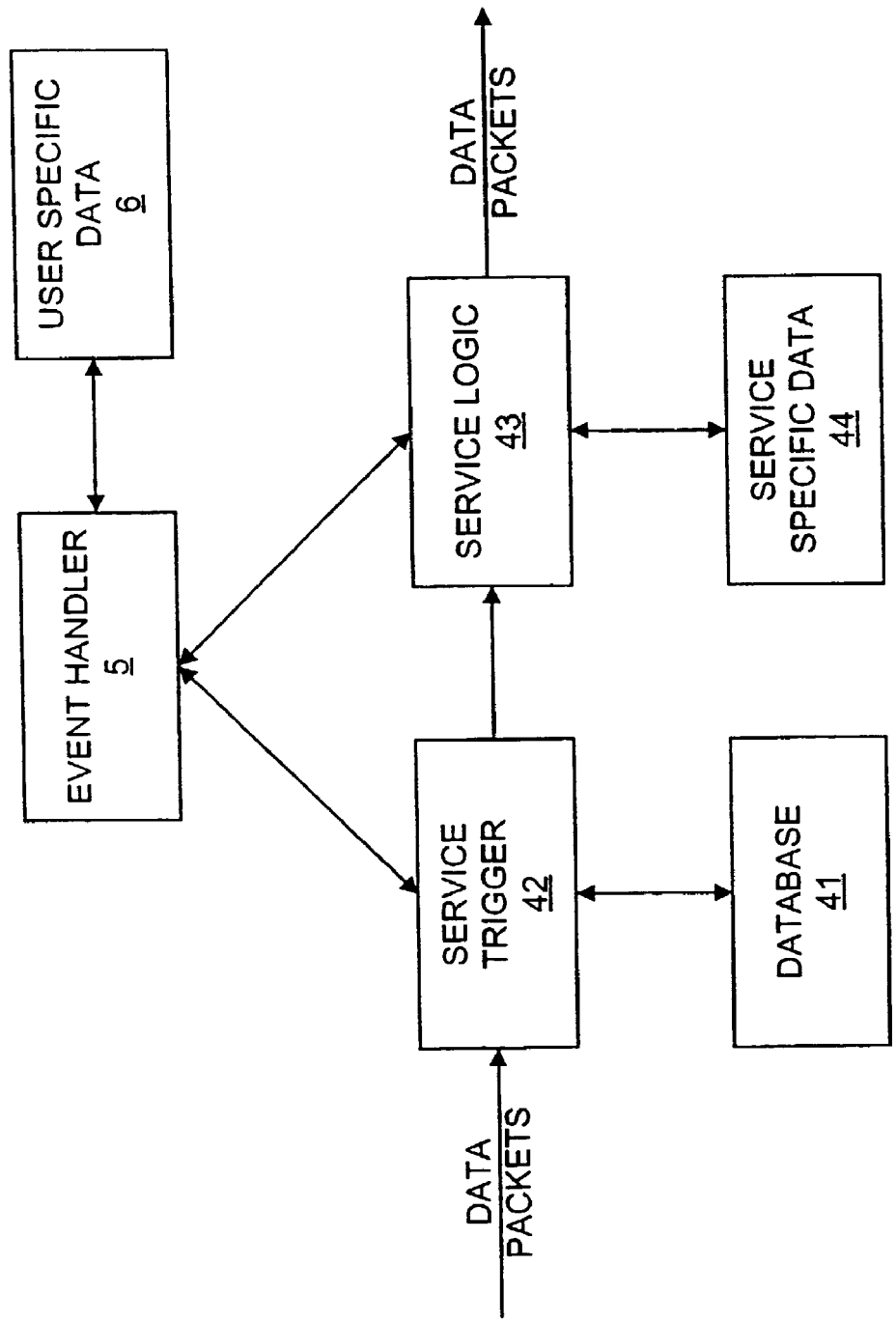
FIG. 3 shows a schematic block diagram of the basic components of a service architecture according to a second embodiment of the present invention.

FIG. 3 shows a service architecture which is suitable for next generation services, in particular packet data services. As shown in FIG. 3, a service trigger 42 receives data packets. The service trigger 42 then decides whether to launch a service logic 43 or not. In case the service trigger 42 launches the service logic 43, the service logic 43 executes the service decided by the service trigger 42. The service trigger 42 reads trigger information from a database 41.

When the service logic 43 is launched by the service trigger 42, a corresponding event handler 5 is also activated. The service logic 43 is able to contact the event handler during its execution. In case the service logic 43 needs user interaction, the event handler 5 is able to ask the user and pass the answer to the service logic 43. The event handler 5 can create new triggers or trigger information for the current service executed in the service logic 43, it can delete a trigger or it can activate a totally new service. In other words, new triggers or trigger information can be created "on the fly" and added to an active service by the event handler 5. In addition, the event handler 5 is able to access user specific data 6 containing user preferences regarding a specific service.

The service logic 43 accesses service specific data 44 which comprises data to run a specific service, for example destination address and tariff data for a premium rate service. The service specific data 44 is not part of the actual logic.

In an IN packet data environment, the service logic 43 may be located in a router, and the event handler may be located in an SCP (Service Control Point). For example, in case packet data is sent via an SSP (Service Switching Point) to the service trigger 42, the service trigger 42 checks whether to send a message to the SCP. If the service trigger 42 sends the message, this message is received by a dialog handler in the SCP. The dialog handler passes the message to the event handler 5 which may ask the user whether a service for the packet data, which is to be executed in the service logic 43 should be activated. The result is passed to the service logic 43. In case the user decides to activate the service, the SCP allows the SSP to continue the sending of packet data.

Figure 4:
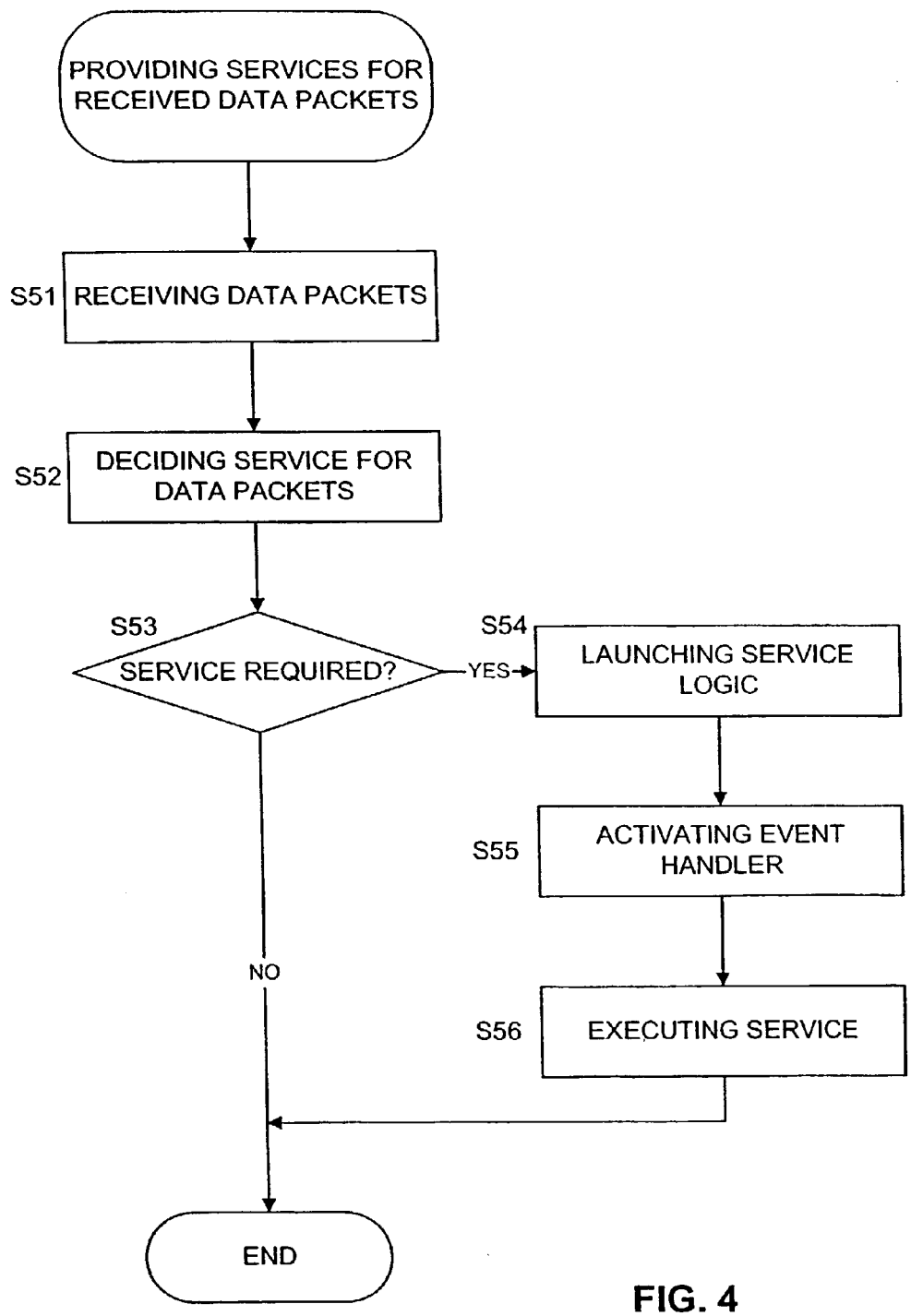
FIG. 4 shows a flowchart of the basic steps of a method according to the second embodiment of the present invention.

FIG. 4 shows a flowchart illustrating the basic steps of the method of receiving data packets and providing services for the data packets according to the present invention. In step S51, the service trigger 42 receives data packets, for example from an SSP. In step S52, the service trigger 42 decides whether a service is to be executed for the received data packets.

In case the service trigger 42 decides in step S53 on the basis of the trigger information in the database 41 that no service is required for the received data packets the process is terminated. In contrast thereto, in case a service is required, the process goes to step S54 where the service logic 43 is launched for the service to be executed. After that, in step S55, the event handler 5 corresponding to the service logic 43 is activated. In this context, the service trigger 42 may contact the event handler 5 as mentioned above, which may ask the user whether the decided service should be activated. In case the decided service should be activated, the service is executed by the service logic 43 in step S56, and then the process is terminated.

The data packets for which a service has been executed by the service logic 43 can be routed in accordance with this service. Hence, the above-described service architecture basically corresponds to the arrangement of the router 1 as shown in FIG. 1. In other words, the service trigger 42, the service logic 43 and the event handler 5 respectively provide similar functions as the detecting means 12, the routing means 13 and the external entity 2 according to FIG. 1.

In order to activate a service for a specific user according to the present invention it is required to get appropriate service trigger(s), service logic and event handler. The choice of the appropriate event handler may for example depend on what kind of terminal type is used by the user, e.g. GSM (Global System for Mobile communications), WAP (Wireless Application Protocol) or GPRS (General Packet Radio Service), if user interaction is required. In a group service there can also exist different event handlers with different access rights for the group members. The group owner can have a more powerful event handler than other group members, i.e. the owner's event handler can be allowed to modify the triggers for the service while others are not. A further step in activating a service is to load any service specific data that is needed statically. Dynamic service specific data is loaded by the service logic. The final step is to get the user specific data for the service.

In the following, a first application example of the present invention relating to the delay problem in using IP for real-time applications will be described.

A rule for detecting special packets may be the determination of the priority of a packet. According to the first application example, the priority of a data packet can be determined by comparing the destination number corresponding to E.164 or the IP address of the received packet with the numbers or addresses stored in connection with the corresponding rule in the storing means 11. For example, when the destination number or IP address of the packet is listed in the corresponding rule, the packet is a special data packet having high priority. The priority of a data packet can also be detected by checking the content of the packet, e.g. the protocol header, as to whether this content is listed in the corresponding rule.

In case a special data packet, i.e. a packet having high priority such as an emergency call, is detected by the detecting means 12, the routing means 13 is informed and notifies the detection to the internal or external entity and requests instructions for handling the special data packet. Thereupon, the internal or external entity informs the routing means 13 that the delivery of the special packet is to be prioritized, which then is carried out by the routing means 13.

With this first application example of the present invention, reliable and fast delivery of high priority data packets can be guaranteed. That is, according to the present invention, the delay problem in using IP for real-time applications can be reduced or even eliminated.

Next, a second application example of the present invention relating to family or group service for data networks will be described.

The purpose of the family service is to provide a convenient method to define a user group and various properties for the group members. The service is targeted for families or small companies. The context of the service is mobile networks supporting Internet Protocol, such as GPRS.

As the use of data services gets more popular, the user group concept is a convenient way to add value to small companies or families. A group consists of a set of predefined users, recognized by SIM (Subscriber Identity Module) cards or passwords or the like. For example, the predefined users can be the members of a particular family. Each group and every member of the respective groups has properties that can be used to restrict or allow different operations. For example, parents might want to restrict the use of WAP (Wireless Application Part) services during school hours, or only allow access to pre-defined content sites. The group can have different properties for different users or a single property can be applied to all members of the group.

According to the second application example, the rule is to determine data packets belonging to members of a group. For this purpose, a list of groups and for each group a list of current members is provided in the storing means 11. In other words, in a corresponding rule in the list of rules stored in the storing means 11, group IP addresses and member IP addresses are listed.

As mentioned above, each group and each member of the group can have a set of properties. An owner like the family head paying the phone bill is defined for each group. The owner is allowed to modify the properties of the group members. A group can have multiple owners. The group member properties define the access rights for the members. Examples for properties are allowed IP addresses, allowed access times, allowed maximum access times, and the like.

According to GPRS, the above-mentioned properties can be defined in the GGSN (Gateway GPRS Support Node) representing the external entity according to FIG. 1. The GGSN is also able to supply the group IP addresses and member IP addresses to the storing means 11.

For example, when the detecting means 12 detects that a packet is to be transmitted to a group member by comparing the destination IP address of the packet with the address listed in the corresponding rule stored in the storing means 11, it informs the routing means 13 which notifies the detected packet to the GGSN and requests instructions from the GGSN for handling the detected special packet. The GGSN may determine upon this request that the special packet was originated from an unallowed IP address or at an unallowed access time or that the maximum access time has been exceeded, and instructs the routing means 13 to drop the packet.

Alternatively, packets coming from certain group members, i.e. packets having a certain source IP address, can be dropped by the routing means 13 in accordance with instructions received from the GGSN.

Hence, according to the second application example of the present invention, a censoring function is implemented in the router 1 simply by adding a rule for detecting special packets. That is, according to the present invention, the implementation of family or group services for data networks is facilitated.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

What is claimed is:

1. An apparatus, comprising:
   a memory configured to store a pre-defined list of rules for detecting special data packets, the special data packets designated to receive special handling when compared to at least one other data packet;
   a detector configured to detect special data packets in a received plurality of data packets based on the pre-defined list of rules stored in said memory;
   a router configured to request instructions for the special data packets detected by said detector and route the special data packets in accordance with instructions received on request; and
   an internal entity configured to store instructions for the special data packets,
   wherein said router is configured to notify said internal entity of the detected special data packets and request instructions for the special data packets from said internal entity, and
   wherein a gateway node is configured to determine and update the instructions stored in said internal entity during active operations, wherein the gateway node is connectable to at least one further router located outside said apparatus.

2. The apparatus of claim 1, wherein the special handling of the special data packets is charged.

3. The apparatus of claim 1, wherein the memory, the detector, the router, and the internal entity are included within the apparatus.

4. The apparatus of claim 1, wherein said router is configured to modify the special data packets in accordance with the received instructions.

5. The apparatus of claim 1, wherein said router is configured to communicate with an external charging entity for charging the routing of the special data packets.

6. A method, comprising:
   storing a pre-defined list of rules for detecting special data packets, the special data packets designated to receive special handling when compared to at least one other data packet;
   detecting special data packets in a received plurality of data packets based on the stored pre-defined list of rules;

requesting instructions for the detected special data packets and routing the special data packets in a data network in accordance with instructions received on request; and notifying an internal entity of the detected special data packets and requesting instructions for the special data packets from said internal entity when requesting the instructions for the detected special data packets, wherein the instructions stored in said internal entity are determined and updated by a gateway node during active operations, wherein the method is used in an apparatus, and the gateway node is connectable to at least one router located outside said apparatus.

7. The method of claim 6, wherein, when the requested instructions are not in the internal entity, said requesting comprises:

notifying said gateway node of the detected special data packets; and requesting instructions for the special data packets from said gateway node.

8. The method of claim 6, wherein the stored rules are determined and updated by said gateway node during active operations.

9. The method of claim 6, wherein said requesting of instructions comprises:

modifying the special data packets in accordance with the received instructions.

10. The method of claim 6, further comprising:

communicating with an external charging entity for charging the routing of the special data packets.

11. An apparatus, comprising:

storing means for storing a pre-defined list of rules for detecting special data packets, the special data packets designated to receive special handling when compared to at least one other data packet;

detecting means for detecting special data packets in a received plurality of data packets based on the pre-defined list of rules stored in said storing means;

routing means for requesting instructions for the special data packets detected by said detecting means and routing the special data packets in accordance with instructions received on request; and internal entity means for storing instructions for the special data packets, wherein said routing means comprises notifying means for notifying said internal entity of the detected special data packets and requesting instructions for the special data packets from said internal entity, and wherein a gateway node comprises means for determining and means for updating the instructions stored in said internal entity during active operations, wherein the gateway node is connectable to at least one further routing means located outside said apparatus.

12. An apparatus, comprising:

a router configured to request instructions for special data packets detected by a detector and route the special data packets in accordance with instructions received on request, the special data packets designated to receive special handling when compared to at least one other data packet;

wherein said router is configured to notify an internal entity of the detected special data packets and request instructions for the special data packets from said internal entity, and wherein, when the requested instructions are not in the internal entity, said router is configured to notify a gateway node of the detected special data packets, and request instructions for the special data packets from said gateway node, wherein the gateway node is connectable to at least one further router located outside said apparatus.

13. The apparatus of claim 12, wherein said router is configured to modify the special data packets in accordance with the received instructions.

14. The apparatus of claim 12, wherein said router is configured to communicate with an external charging entity for charging the routing of the special data packets.

15. A non-transitory computer-readable storage medium storing a computer program product, said computer program product being configured to control a processor to perform a process, the process comprising:

storing a pre-defined list of rules for detecting special data packets, the special data packets designated to receive special handling when compared to at least one other data packet;

detecting a special data packets in a received plurality of data packets based on one of the stored pre-defined list of rules;

requesting instructions for the detected special data packets;

routing the special data packets in a data network in accordance with instructions received upon the request;

notifying an internal entity of the detected special data packets; and requesting instructions for the special data packets from the internal entity when requesting the instructions for the detected special data packets, wherein the instructions stored in the internal entity are determined and updated by an gateway node during active operations, and wherein the computer program product is used in an apparatus, and the gateway node is connectable to at least one router located outside said apparatus.

16. An apparatus, comprising:

routing means for requesting instructions for special data packets detected by a detecting means and routing the special data packets in accordance with instructions received on request, the special data packets designated to receive special handling when compared to at least one other data packet;

wherein said routing means comprises notifying means for notifying an internal entity of the detected special data packets and requesting instructions for the special data packets from said internal entity, and wherein, when the requested instructions are not in the internal entity, said routing means comprises notifying means for notifying a gateway node of the detected special data packets, and requesting instructions for the special data packets from said gateway node, wherein the gateway node is connectable to at least one routing means located outside said apparatus.

17. A method, comprising:

requesting instructions for special data packets detected by a detector, the special data packets designated to receive special handling when compared to at least one other data packet;

routing the special data packets in accordance with instructions received on request;

notifying an internal entity of the detected special data packets;

requesting instructions for the special data packets from said internal entity;

notifying, when the requested instructions are not in the internal entity, a gateway node of the detected special data packets; and requesting, when the requested instructions are not in the internal entity, instructions for the special data packets from said gateway node, wherein the gateway node is connectable to at least one router located outside an apparatus comprising the gateway node.

18. The method of claim 17, further comprising:

modifying the special data packets in accordance with the received instructions.

19. The method of claim 17, further comprising:

communicating with an external charging entity for charging the routing of the special data packets.

20. A non-transitory computer-readable storage medium storing a computer program product, said computer program product being configured to control a processor to perform a process, the process comprising:

requesting instructions for special data packets detected by a detector, the special data packets designated to receive special handling when compared to at least one other data packet;

routing the special data packets in accordance with instructions received on request;

notifying an internal entity of the detected special data packets;

requesting instructions for the special data packets from said internal entity;

notifying, when the requested instructions are not in the internal entity, a gateway node of the detected special data packets; and requesting, when the requested instructions are not in the internal entity, instructions for the special data packets from said gateway node, wherein the gateway node is connectable to at least one router located outside an apparatus comprising the gateway node.

* * * * *